(12) United States Patent
Jalili (10) Patent No.: US 7,593,870 B2
(45) Date of Patent: *Sep. 22, 2009

(54) METHOD FOR TELEPHONE-BASED AUTHENTICATED AUTHORIZATION OF TRANSACTIONS

(76) Inventor: Reza Jalili, 1 Vincent Rd. #3-0, Bronxville, NY (US) 10708

( * ) Notice: Subject to any disclaimer, the term of this patent is extended or adjusted under 35 U.S.C. 154(b) by 485 days.

This patent is subject to a terminal disclaimer.

(21) Appl. No.: 11/041,077

(22) Filed: Jan. 14, 2005

(65) Prior Publication Data

US 2005/0154649 A1 Jul. 14, 2005

Related U.S. Application Data

(60) Division of application No. 09/606,929, filed on Jun. 29, 2000, now abandoned, which is a continuation-in-part of application No. 08/700,861, filed on Aug. 21, 1996, now Pat. No. 6,088,683.

(51) Int. Cl.
G06Q 30/00 (2006.01)

(52) U.S. Cl. ............................. 705/26; 705/1; 705/24; 705/27

(58) Field of Classification Search .................... 705/26
See application file for complete search history.

(56) References Cited

U.S. PATENT DOCUMENTS

| | | | | |
|---|---|---|---|---|
| 4,823,264 A | * | 4/1989 | Deming | 705/39 |
| 5,267,149 A | * | 11/1993 | Anada et al. | 705/44 |
| 5,329,589 A | * | 7/1994 | Fraser et al. | 379/91.02 |
| 5,343,529 A | * | 8/1994 | Goldfine et al. | 705/75 |
| 5,475,585 A | * | 12/1995 | Bush | 705/26 |
| 5,479,510 A | * | 12/1995 | Olsen et al. | 705/17 |
| 5,485,510 A | * | 1/1996 | Colbert | 379/145 |
| 5,550,897 A | | 8/1996 | Seiderman | 455/558 |
| 5,590,197 A | * | 12/1996 | Chen et al. | 705/26 |
| 5,677,955 A | * | 10/1997 | Doggett et al. | 705/76 |
| 5,692,132 A | * | 11/1997 | Hogan | 705/27 |
| 5,710,887 A | | 1/1998 | Chelliah et al. | 705/26 |

(Continued)

OTHER PUBLICATIONS

Kelle Harris, Cashing In, Jun. 1996, Sporting Goods Business, vol. 29, Iss. 6, pp. 1-4.*

*Primary Examiner*—Jeffrey A. Smith
*Assistant Examiner*—Jason Dunham
(74) *Attorney, Agent, or Firm*—Workman Nydegger (57) ABSTRACT

A method of completing a purchase utilizing a first electronic network and a second electronic network, the method being applicable for example to a case in which the second network (which may be the public telephone system) is considered by knowledgeable people to be more secure than the first network (which may be the Internet). The method comprises the steps of (a) registering over the second network a customer's financial information in a central processing center; (b) ordering over the first network a good or service that the customer desires to purchase from a merchant; (c) supplying identifying information to the merchant pertaining to the customer; (d) supplying information from the merchant to the processing center pertaining to the purchase; (e) establishing a contact between the customer and the processing center in which the customer is identified to the processing center and the customer expresses intent to complete the purchase; and (f) debiting an account of the customer and crediting an account of the merchant in order to complete the purchase.

21 Claims, 3 Drawing Sheets

U.S. PATENT DOCUMENTS

| | | | |
|---|---|---|---|
| 5,715,314 A * | 2/1998 | Payne et al. | 705/78 |
| 5,715,397 A * | 2/1998 | Ogawa et al. | 709/246 |
| 5,717,989 A * | 2/1998 | Tozzoli et al. | 705/37 |
| 5,724,412 A * | 3/1998 | Srinivasan | 379/93.23 |
| 5,724,423 A * | 3/1998 | Khello | 705/72 |
| 5,724,424 A * | 3/1998 | Gifford | 705/79 |
| 5,727,163 A * | 3/1998 | Bezos | 705/27 |
| 5,729,594 A * | 3/1998 | Klingman | 705/26 |
| 5,742,684 A * | 4/1998 | Labaton et al. | 705/72 |
| 5,757,917 A * | 5/1998 | Rose et al. | 705/79 |
| 5,799,285 A * | 8/1998 | Klingman | 705/26 |
| 5,825,881 A * | 10/1998 | Colvin, Sr. | 705/78 |
| 5,873,072 A * | 2/1999 | Kight et al. | 705/40 |
| 5,890,137 A * | 3/1999 | Koreeda | 705/26 |
| 6,227,447 B1 | 5/2001 | Campisano | 235/380 |
| 6,341,724 B2 | 1/2002 | Campisano | 235/380 |
| 2002/0143634 A1 | 10/2002 | Kumar et al. | 705/18 |

* cited by examiner

METHOD FOR TELEPHONE-BASED AUTHENTICATED AUTHORIZATION OF TRANSACTIONS

CROSS REFERENCE TO RELATED APPLICATIONS

This is a divisional of U.S. Continuation-In-Part patent application Ser. No. 09/606,929 filed Jun. 29, 2000, in the name of Reza JALILI and entitled "SYSTEM AND METHOD FOR TELEPHONE-BASED AUTHENTICATED AUTHORIZATION OF TRANSACTIONS," which is a CIP of U.S. patent application Ser. No. 08/700,861 filed Aug. 21, 1996, now U.S. Pat. No. 6,088,683, in the name of Reza JALILI and entitled "SECURE PURCHASE TRANSACTION METHOD USING TELEPHONE NUMBER," incorporated by reference.

BACKGROUND OF THE INVENTION

1. Field of the Invention

The present invention relates to systems and methods for conducting financial transactions, and in particular, utilizing the Internet, including the World-Wide Web, and the public telephone system.

2. Background Art

The telephone system in place in this country offers a service which identifies to a called party the telephone number of the calling party. This service is robust, secure, and to the best of Applicant's knowledge, always correct. This service has been used by computerized information systems for many years in the field of customer care and customer assistance to provide, for example, a customer care representative with records associated with the calling party. Such systems have reduced the need for a called party to make extensive inquiries from the calling party. Other systems presently in use allow a caller to automatically activate a new credit-card by calling from the caller's home telephone and by inputting with the telephone's touch-tone keypad the caller's social security number or other identification presumably known only by the caller and the called party.

Many systems are presently in place to provide telephonic shopping for goods and services as an alternative to physical presence in a store. For example, customers often use a paper catalog for selection of goods and use a telephone for placing orders and for paying for orders. While this method of shopping can be convenient, it involves printing and distribution costs associated with the paper catalogs as well as costs associated with a call-handling center. For the shopper, each purchase requires a separate transaction with the particular merchant involved. A shopper cannot browse several catalogs, cannot choose a number of items for purchase and make a single call to central number to complete the entire purchase transaction. For each separate purchase, there is a requirement for providing shipping and billing information. Additionally, a paper catalog is more limited than an Internet-based catalog in the amount of information it can present to a customer.

Increasingly, merchants are selling goods and services on the World-Wide Web (WWW). However, although the Web is ideal for browsing, online transactions are not secure over a public network. Even with the available encryption systems, customers are wary of transmitting their credit card numbers, since the credit card information will be passed from node to node and therefore will be subject to interception at multiple points. There is a need for transactions to be made more safely and conveniently while maintaining the convenience of browsing the WWW.

To the best of Applicant's knowledge, in all present methods of purchasing goods and services using the Internet, one of the following is true: the customer is required to transmit sensitive financial information over a non-secure medium; the customer is required to memorize a password or other secret code; the customer is required to note the merchant's telephone number to call; the customer is required to provide shipping and billing information; the customer is required to complete each purchase transaction with each merchant separately and independently of the customer's transactions with other merchants. Any one of the requirements is alone limiting. Furthermore, the repetitive burden of providing billing and shipping information to more than one merchant is a source of errors, frustration, and lost sales.

In summary, paper catalog sales are generally regarded as being safe, but suffer from the lack of features which are provided by the Internet, namely browsing of extensive information, instant access to cross-referenced items, increased number of items available for selection, reduced cost of catalog distribution, and other conveniences.

Figure 1:
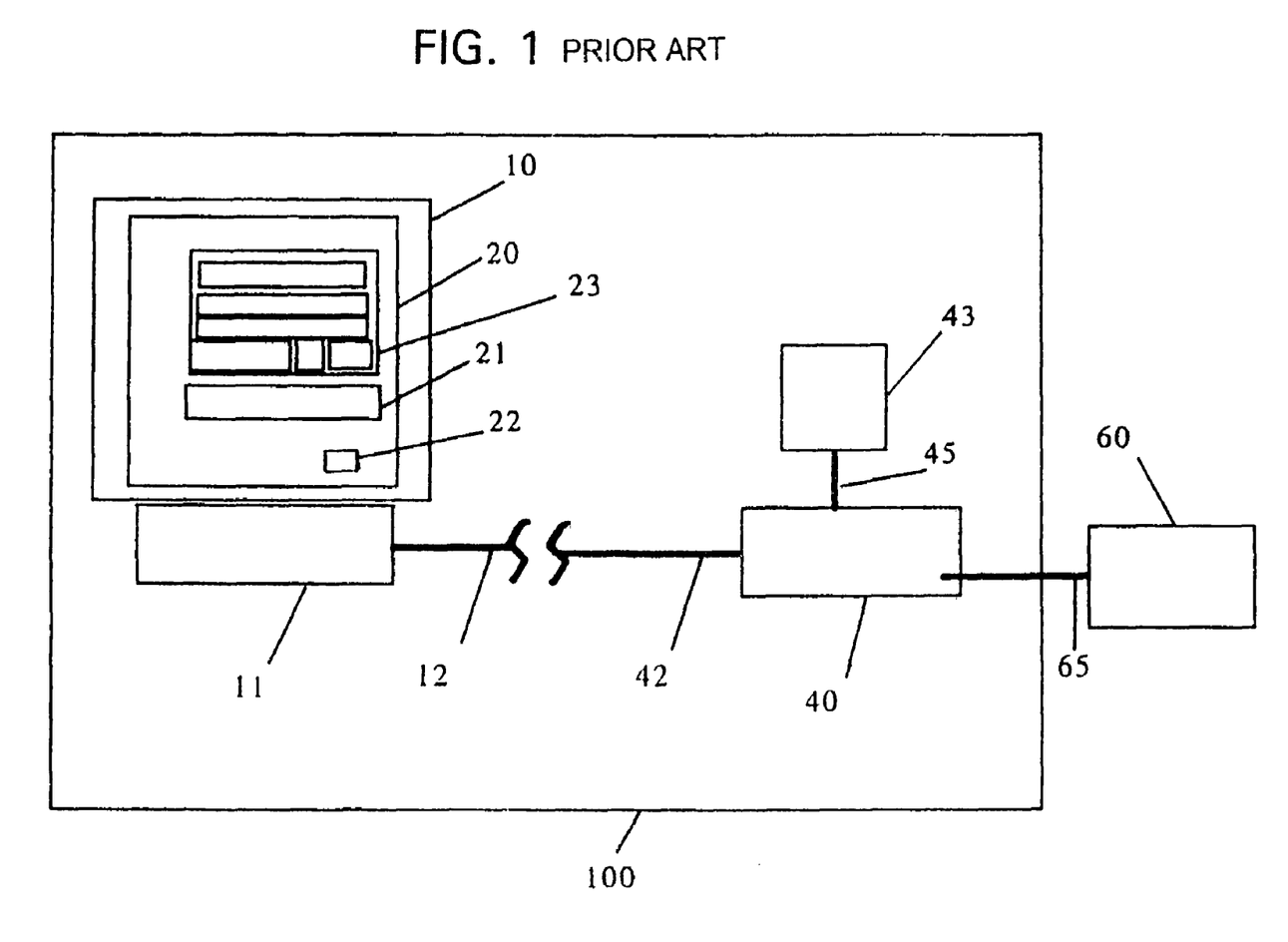
FIG. 1 is a system architecture block diagram of an exemplary prior art electronic shopping system.

A basic electronic commerce system 100 using the Internet is shown in FIG. 1. A user's computer, 11, is connected using a network connection to the Internet, 12, to a merchant's web server, 40, connected to the Internet by a network connection, 42. The user's computer displays the merchant's web page 20, on its display, 10. The user selects items for purchase by clicking on appropriate links and buttons on the merchant's web page. As items are selected by the user, the web server adds the selected items to a database, 43, connected to the web server, 40, by a private network link, 45. This system, 100, is in use by a number of online stores. To purchase the selected items, the user enters personal information such as shipping address and name in an input area 23 of the web page, and financial information such as a credit-card number, in an area 21, for use by the merchant's web server, 40. When user clicks on a button, 22, to indicate the desire to purchase the selected items, the financial information, 21, is transmitted to the web server, 40, using the Internet connection, 12, and the Internet connection, 42. The web server, 40, associates the financial information, 21, with the selected items in the database, 43, creates a sales record, connects to a merchant financial transaction center, 60, using a link, 65, which uses either the Internet or a private network, for authorization of the transaction, and, upon approval, confirms the sales record in the database, 43.

At this point, the selected items have been purchased and can be delivered to the user. The selection sub-system, 100, together with the financial transaction center, 60, comprise an electronic commerce system.

U.S. Pat. No. 5,677,955, hereinafter "Doggett '955", discloses a system for Internet transactions. Doggett '955 discloses the use of cryptography to increase the security of messages transmitted over the Internet between a buyer and merchant of goods and between a merchant and a buyer's financial institution.

Rose et al.'s U.S. Pat. No. 5,757,917, hereinafter "Rose '917", teaches an improvement on previous purchasing systems by suggesting the use of E-mail as means for confirming the customer's intent to purchase goods and services and also as means for verifying the identity of the customer. Rose '917 relies on E-mail, which is generally not considered a secure means of communication.

First Virtual Holdings, Inc., hereinafter, "FVH", is the assignee of Rose '917. FVH operated a members-only payment system wherein a "VirtualPIN" was assigned to its members. Merchants affiliated with the transaction center accepted a member customer's "VirtualPIN" in lieu of a credit-card number and contacted FVH to translate the customer's alias into a credit-card number and payment authorization.

The Internet is an ever-increasingly popular tool for consumers to get information on goods and services, to make comparisons between different products from different companies, and to browse catalogs and on-line stores. Electronic commerce is hindered by the lack of security inherent in the Internet's design and infrastructure.

The Internet has disadvantages. It is considered by knowledgeable persons not to be adequately secure. Use of the Internet typically requires a PC and appropriate software. While most PC users have the basic requirements for accessing Internet stores, electronic commerce solutions on the market today require users to install additional software, such as an electronic wallet or electronic transaction assistant.

Users of the Internet typically establish a connection to the Internet using a PC and use a web browsing software called a "browser." A session on the Internet is the period from when a connection to the Internet is established to when that connection is terminated.

Cryptographic techniques have been the predominant solution offered to solve the security problem of transactions conducted using the Internet.

SUMMARY OF THE INVENTION

Accordingly, one object of the present invention is to improve the security of transactions which use the Internet.

Another object of the invention is to simplify selection of goods and services from a plurality of merchants by using the Internet.

Another object of the invention is to reduce the need for modification of the purchaser's PC through the addition of hardware or software beyond a connection to the Internet and a web-browser.

Another object of the present invention is to simplify the process of purchasing goods and services by using the Internet.

Another object of the present invention is to reduce the need for cryptography in such transactions.

One aspect of the invention provides a method and system for allowing a customer to select an item for purchase without actually purchasing that item until the customer makes a telephone call from the customer's registered telephone number, typically a home or office number, and explicitly makes a choice to approve purchase of the selected item. The present invention allows a customer to make a plurality of selections from a plurality of merchants and still conclude the plurality of purchases with a single telephone call.

According to another aspect, the invention is directed to a method and system for carrying out a commercial transaction using a public network, such as the Internet, in combination with a secure dial-up network, such as the public telephone system. Each network offers certain advantages and disadvantages. The present invention teaches a process which integrates the advantages of the two networks and results in non-obvious and unexpected results. The present invention relies on the recognition that certain elements of a transaction are not sensitive and may be communicated over the Internet, while other elements are sensitive and need to be communicated in a secret and secure manner. The non-sensitive elements are communicated using the Internet, which is an inherently less expensive medium to use. The sensitive information is communicated using a standard telephone, which provides a one-to-one private connection. The telephone company's subscriber identification service can be used to identify with sufficient certainty the telephone number of the calling party. The subscriber identification service is well-known in this country as CallerID and is hereinafter referred to as "CallerID".

A further aspect of the invention relates to a data processing and communications system as shown and described herein.

Technology for integration of telephone systems with automated voice-response systems is well-known and familiar to both implementers of such systems and the users of such systems.

A first advantage of the invention is that a third party, namely a transaction center, is utilized for the financial processing of the transaction, whereby all need for the merchant to have the customer's credit card information may be eliminated.

According to a second advantage of the invention, if it is desired for the merchant to receive the credit card information, that information can be transmitted directly to the merchant from a central office, over a single link, which is more secure than the information being transferred between multiple nodes over the Internet.

Another advantage of the present invention is that it simplifies the process of purchasing goods and services by using the Internet.

Another advantage of the present invention is that it reduces the dependency on cryptographic technology for the transmission of financial information related to the transaction.

Another advantage of the present invention is that it provides protection against computer viruses, sometimes referred to as "Trojan Horses" running on the purchaser's computer, which are typically used to steal passwords, credit card numbers, and other sensitive information.

Another advantage of the present invention is that it reduces the need for modification of the purchaser's PC through the addition of hardware or software beyond a connection to the Internet and a web-browser.

Another advantage of the present invention is that a plurality of transactions can be completed with a single telephone call.

Another advantage of the present invention is that a plurality of items from a plurality of merchants can be selected for a future purchase decision within a single session on the Internet.

Another advantage of the present invention is that a plurality of items from a plurality of merchants can be selected separately from the transaction in which those items are purchased.

Another advantage of the present invention is that the customer needs to remember only a single well-known telephone number. This number is typically the customer's home or office telephone number.

Other objects, features and advantages of the present invention will become apparent from the following description of several embodiments of the invention which refers to the accompanying drawings.

BRIEF DESCRIPTION OF THE DRAWINGS

For a fuller understanding of the invention, reference is had to the following description taken in connection with the accompanying drawings, in which.

DETAILED DESCRIPTION OF EMBODIMENTS OF THE INVENTION

Figure 2:
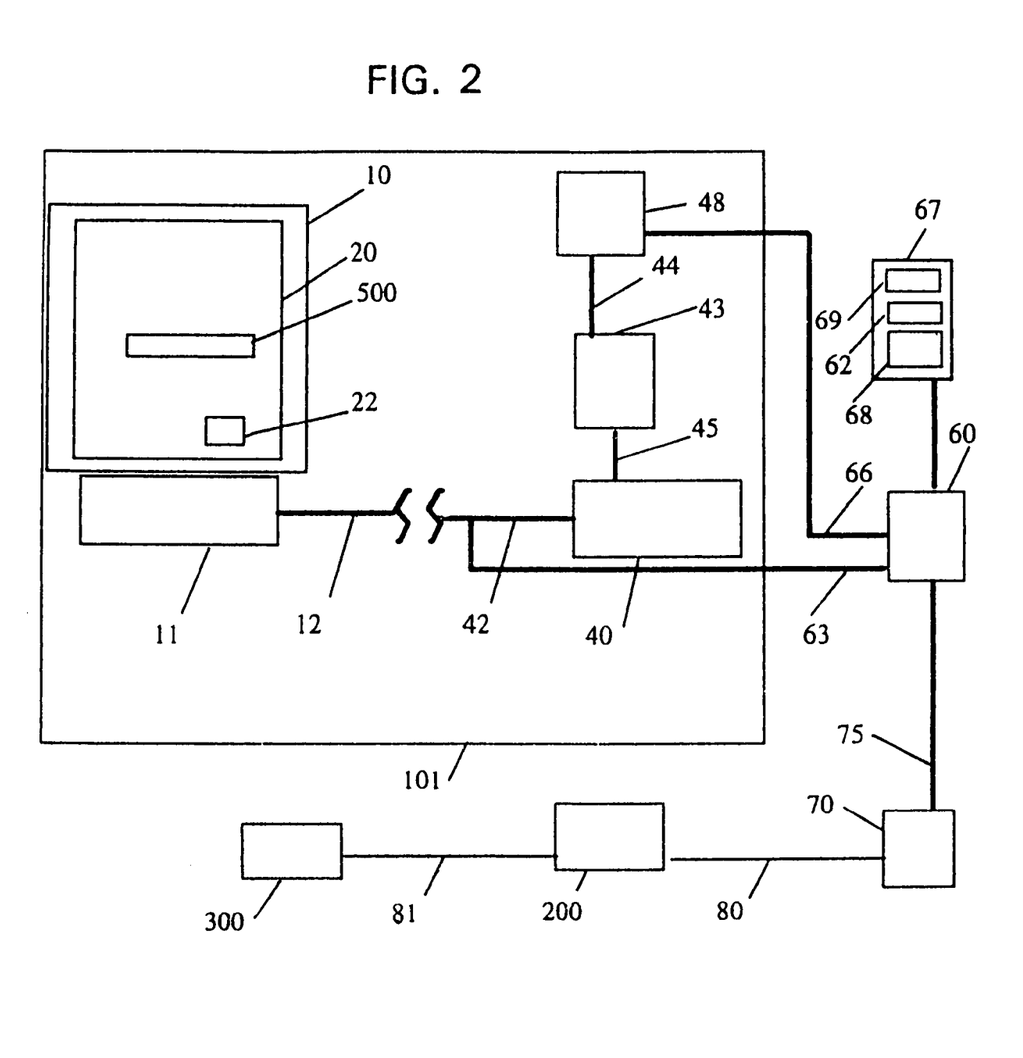
FIG. 2 is a system architecture block diagram of an exemplary system embodying the present invention.

Reference is first made to FIG. 2 which depicts a secure transaction system in which, a transaction center, 60, has a quasi-public network link, 63, a secure link, 66, to a merchant, 48. The quasi-public network is, for example, the Internet. The merchant, 48, has a secure internal link, 44, to its data storage and computer systems, 43, which are linked also to its web server, 40, through a secure link, 45. The transaction center 60 has equipment for sending and receiving voice and data on a link, 75, connected to a telephone device with CallerID capabilities, 70, and equipment for communicating caller identification information to the transaction center, 60. The telephone device, 70 is linked to a central office, 200, by a link, 80. The central office, 200, is connected to a subscriber, 300, by a link, 81.

In one embodiment of the present invention, the transaction center receives from the merchant's web-server, 40, a purchase set, 68, of goods and services selected by a customer for purchase from the merchant and stores it in a database 67. The purchase set lists the goods and services selected by the customer on the web-site, and also includes the customer's telephone number as entered on the merchant's web-site for identification purposes by the customer.

The transaction center saves received purchase sets for a period of time specified by the merchant or for a period of time specified by the customer associated with the telephone number associated with the purchase set, whichever lifetime period is shorter. The transaction center can also associate certain rules such as discounts or additional advantages for the customer to be applied under specified conditions, such as the completion of the purchase by the customer within the lifetime period of the purchase set.

The transaction center has the telephone device, 70, for answering an incoming telephone call and for identifying the caller's telephone number prior to answering the telephone. This capability is a feature of the CallerID service offered by telephone companies in this country. The transaction center is equipped, via the link 75, for communicating with voice and data using the telephony device, 70. The transaction center 60 is also equipped for looking up purchase sets associated with the caller's telephone number. If the caller is identified as a registered customer, any purchase sets can be read to the customer over the telephone using a text-to-speech system or displayed to the caller on a display if the caller is using a modem connection and a display device. If the caller is not identified as a customer, then the system can respond appropriately, for example, by informing the caller of the fact and offering to allow the caller to become a registered customer.

The web-server, 40, receives input from a customer indicating the goods and services to be placed in a purchase set and receives a telephone number, 500, from the customer as an identifier to be associated with the customer's purchase set. The web-server, 40, communicates the purchase set and the associated telephone number, 500, to the transaction center using link, 42. Note that no other piece of information is required from the customer and that the required information need not be communicated securely for customers with listed telephone numbers nor for customers with unlisted telephone numbers who nevertheless do not object to having their telephone number communicated on Internet links, 42 and 12.

Further note that the purchase set is also not sensitive information and can be communicated to the transaction center using the Internet link, 42. The purchase set and the telephone number are not sensitive because they cannot be used for theft or profit to the disadvantage or harm of the customer or merchant or transaction center.

If the caller is verified and allowed to approve purchase items, then the customer is prompted to create a purchase instruction set, 69, by giving a purchase instruction for each purchase item. A purchase instruction will specify payment authorization for an item, thereby moving that item into a paid set, 62, reject payment for an item, thereby removing the item from the purchase list, or defer a decision on an item, thereby keeping the item on the purchase list.

As noted earlier, if the lifetime of a purchase list expires, then the purchase list is removed. Three embodiments of the invention are disclosed herein. The disclosed embodiments have in common an initial registration step, in which a customer registers one or more credit-cards with a central office, which will be referred to herein as the transaction center. The registration can be made over the telephone, 70, or by a written application, and therefore is secure. The primary feature of the registered information is a registered telephone number. The registered information may include a preferred shipping address such as the customer's home. In the registration process, the transaction center can verify the source of the registered telephone number by the use of the telephone system's CallerID function.

An alternate telephone number can be accepted if the customer is not calling from the number that is desired to be registered. In that case, or if desired for any other reason, a human operator at the transaction center can call back the registrant and/or request additional identification information before accepting the registration information.

The registration information may include a name to be used for identification (not necessarily the name on the credit cards), credit card information, telephone number, shipping address, optional PIN, preferred approval method, self-imposed credit limit, e-mail address, alternate name used by the customer, statement mailing address, or credit-card preference list.

Figure 3:
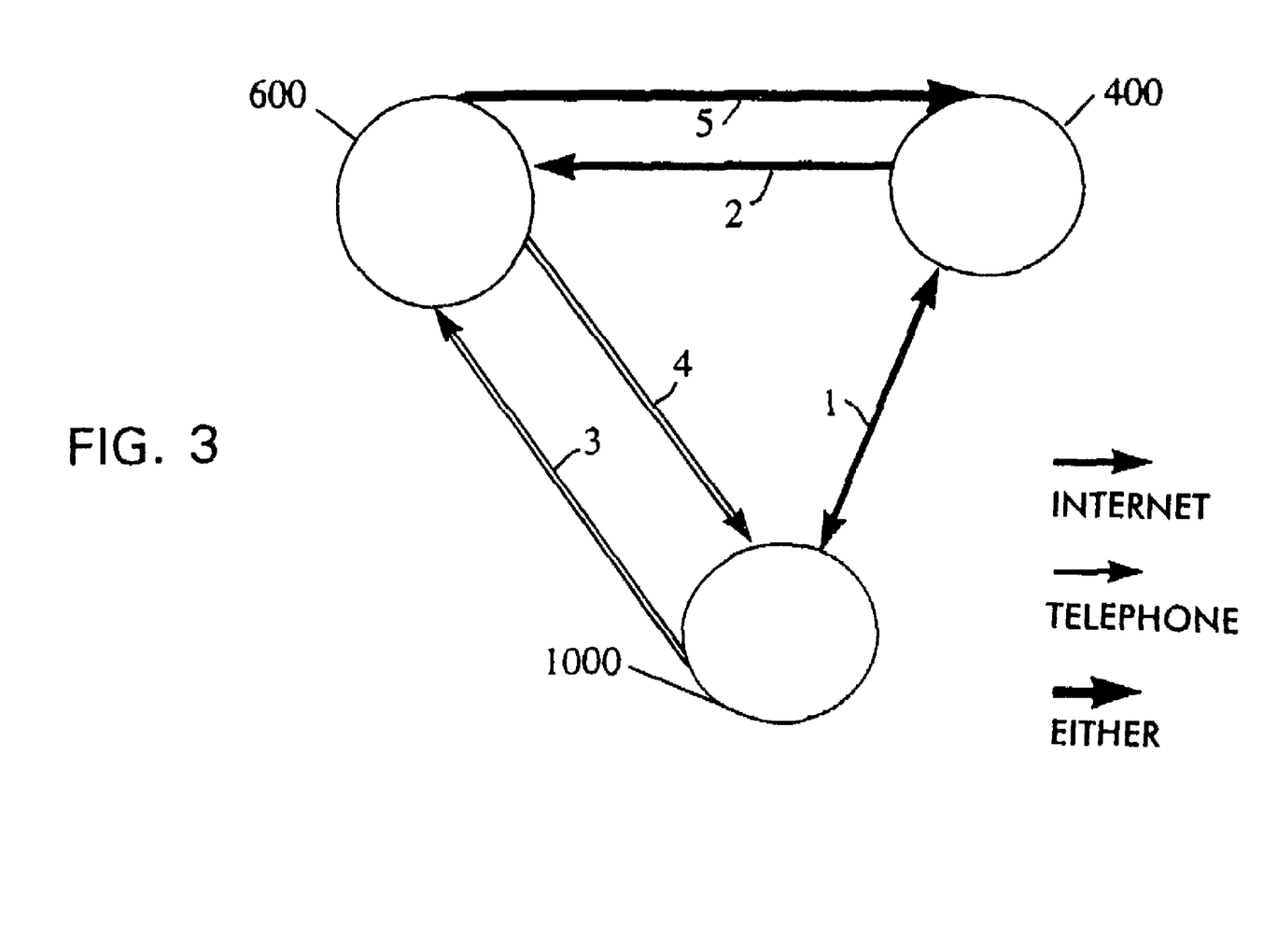
FIG. 3 is a schematic diagram illustrating the steps in a method according to several embodiments of the invention.

Reference is next made to FIG. 3 which shows schematically the steps involved in a transaction according to a first embodiment of the invention. For clarity, additional references are made to FIG. 2.

When shopping, the customer browses for goods and services using a public network (the Internet or World-Wide Web).

In step 1, the customer 1000 selects the goods or services to be purchased and identifies himself by registered name and telephone number. The customer optionally may give additional information such as an alternate shipping address, a method of credit approval, or a purchase set expiration time different from that supplied by the merchant or by the transaction center.

In step 2, the merchant, 400, then delivers a purchase number together with a merchant number to the transaction center 600 by E-mail, phone, or another means, for example on a purchase set addressed to the transaction center. The invoice may have a stated lifetime which may be supplied by the merchant or by the customer's information registered with the transaction center. The purchase set may include the buyer's registered name (not necessarily his real name), the merchant's name and identification number, a list of items being purchased together with the price of each, a total price, an expiration time, or optional attachments for the merchant's use. The purchase set is delivered to the transaction center, 600, along with the telephone number, 500, supplied by the customer to the merchant.

In step 3, to complete the sale, the customer accesses the transaction center using a phone or a modem. The customer is identified by the telephone company's CallerID function optionally plus a personal identification number (PIN) and/or other registered information for extra security. If the customer's telephone number on file with the transaction center does not match the telephone number detected by CallerID, an operator will ask the customer for further identifying information.

Upon recognizing the customer, the transaction center lists all outstanding purchase sets and gives the customer the opportunity to make a selection and thereby express intent to complete the sale. This step may be realized using an automated voice-response system which reacts to touch-tone telephone tones or one that reacts to human speech. The use of automated voice-response systems in customer help and, for example, airline ticketing applications, is well-known. The transaction center logs the customer's selections. When the mode of interaction is voice, a transaction representative will handle the transaction through human conversation. When the mode of interaction is through a voice response unit, the buyer will use the telephone keypad to respond to the choices presented by the system. The choices will allow the buyer to select the purchase set(s) to be paid or canceled, and the credit card(s) to be used. When the mode of interaction is through a programmed computer using a modem, the decisions are entered using the keyboard and/or mouse.

In step 4, the transaction center sends an E-mail message to the customer to confirm the invoices and payments that the customer has approved.

Then, in step 5, the transaction center debits the customer's pre-registered credit-card and credits the merchant over a standard private credit-card transaction system. The transaction center also sends an acknowledgment of the acceptance of the sale and of the credit to the merchant by phone, E-mail, or another means. The acknowledgment sent to the merchant includes the buyer's shipping address and possibly other delivery information as specified by the customer during the registration process or during the process of approving purchase set items.

A second embodiment differs from the first embodiment in that in step 3, the transaction center can itself initiate confirmation of the sale by sending an E-mail message or placing a telephone call to the customer upon receipt of the sale information or invoice from the merchant. An advantage of this embodiment is that it more securely confirms the identity of the customer and the fact that the sale is authorized. It also reminds the customer that the sale is pending and encourages the customer to complete the sale.

The customer can be given control over whether it is the customer or the transaction center who makes the telephone or modem contact in step 3 to complete the sale. The party who will make the contact can be specified either on the transaction application, for all sales, or on the merchant's form for a given sale.

In step 5, in a third embodiment of the invention, the transaction center can deliver the customer's credit card information securely to the merchant upon receipt of the customer's approval of the sale. As an additional security precaution, the transaction center can confirm to the customer by E-mail or another channel that the customer's information has been sent to the merchant. An advantage of this embodiment is that the transaction center is not required to have access to the conventional banking channels.

The transaction center can communicate the purchaser's financial information to the merchant using a modem and a telephone connection, or using digital certificates and an Internet connection. The transaction center can communicate the purchaser's financial information to the merchant's bank or conduct a banking transaction on behalf of the purchaser by using a modem and a telephone connection, or by using digital certificates and an Internet connection. The transaction center can communicate the purchaser's financial information certificate to the purchaser's bank or purchaser's credit-card account, again, by phone or by digital certificates.

Other well-known communication links can be used. Other well-known encryption methods can be used.

It will thus be seen that the objects set forth above, among those made apparent from the preceding description, are efficiently attained and, since certain changes may be made in carrying out the above methods and in the systems set forth without departing from the spirit and scope of the invention, it is intended that all matter contained in the above description and shown in the accompanying drawings shall be interpreted as illustrative and not in a limiting sense. Although the present invention has been described in relation to particular embodiments thereof, many other variations, equivalents, modifications and other uses will become apparent to those skilled in the art. Therefore, the present invention is not limited by the specific disclosure herein.

What is claimed is:

1. A method in a transaction center of enabling a customer and a merchant to complete a purchase utilizing a first electronic network and a second electronic network; comprising the steps of:
   (a) registering over the second electronic network a customer's financial information in the transaction center;
   (b) in response to the customer ordering over the first electronic network a good or service that the customer desires to purchase from a merchant, and the customer supplying identifying information to the merchant pertaining to the customer, the transaction center receiving from the merchant information pertaining to the purchase;
   (c) establishing, over the second electronic network, a contact with the customer in which the customer is identified to the transaction center and the customer is enabled to express intent to complete the purchase; and
   (d) electronically debiting an account of the customer and crediting an account of the merchant in order to complete the purchase.

2. A method as in claim 1, further comprising the step in the transaction center of verifying the source of the customer's financial information.

3. A method as in claim 1 wherein the second electronic network includes the Internet.

4. A method as in claim 1 wherein the second electronic network includes a telephone network.

5. A method as in claim 4 further comprising the steps of:
   receiving CallerID information from the customer; and
   establishing communication with the customer over the telephone network using said CallerID information from the customer.

6. A method as in claim 1 wherein the customer's financial information includes one or more of the following: credit card information, debit card information, and bank account information.

7. A method as in claim 1 further comprising the step of registering a customer's non-financial information in the transaction center, said non-financial information including one or more of the following: the customer's weight, height, preferences, and addresses.

8. The method of claim 1, wherein electronically debiting the account of the customer and crediting the account of the merchant in order to complete the purchase is performed by the transaction center.

9. The method of claim 1 wherein electronically debiting the account of the customer and crediting the account of the merchant in order to complete the purchase comprises transmitting the customer's financial information to the merchant.

10. The method of claim 1 wherein establishing, over the second electronic network, the contact with the customer in which the customer is identified to the transaction center and the customer is enabled to express intent to complete the purchase comprises the customer initiating a telephone call to the transaction center from a phone number having corresponding CallerID information identifying the customer.

11. The method of claim 1 wherein registering over the second electronic network the customer's financial information in the transaction center further comprises registering a telephone number of the customer.

12. The method of claim 11 wherein establishing, over the second electronic network, the contact with the customer in which the customer is identified to the transaction center and the customer is enabled to express intent to complete the purchase comprises the transaction center initiating a telephone call to the telephone number of the customer.

13. The method of claim 1, farther comprising (d) electronically debiting an account of the customer and crediting an account of the merchant in order to complete the purchase.

14. A method in a transaction center of enabling a customer and a merchant to complete a purchase utilizing a first electronic network and a second electronic network; comprising the steps of:
  (a) registering a customer's financial information in the transaction center;
  (b) in response to the customer ordering over the first electronic network a good or service that the customer desires to purchase from a merchant, and the customer supplying identifying information to the merchant pertaining to the customer, the transaction center receiving from the merchant information pertaining to the purchase;
  (c) establishing, over the second electronic network, a contact with the customer in which the customer is identified to the transaction center and the customer is enabled to express intent to complete the purchase; and
  (d) electronically debiting an account of the customer and crediting an account of the merchant in order to complete the purchase only if contact is established over the second electronic network and the customer expresses intent to complete the purchase within a predetermined time period.

15. A system comprising:
  a transaction center including a device configured to receive information over a first electronic network and a second electronic network, the transaction center further configured to
  (a) register a customer's financial information in the transaction center;
  (b) in response to the customer ordering over the first electronic network a good or service that the customer desires to purchase from a merchant, and the customer supplying identifying information to the merchant pertaining to the customer, receive from the merchant information pertaining to the purchase;
  (c) establish, over the second electronic network a contact with the customer in which the customer is identified to the transaction center and the customer is enabled to express intent to complete the purchase; and
  (d) initiate electronic debiting of an account of the customer and crediting of an account of the merchant in order to complete the purchase.

16. The system of claim 15 wherein the second electronic network includes the Internet.

17. The system of claim 15 wherein the second electronic network includes a telephone network.

18. The system of claim 17 wherein the transaction center is further configured to:
  receive CallerID information from the customer; and
  establish communication with the customer over the telephone network using the CallerID information from the customer.

19. The system of claim 15 wherein the customer's financial information includes one or more of the following: credit card information, debit card information, and bank account information.

20. The system of claim 15 wherein the transaction center is configured to initiate debiting the account of the customer and crediting the account of the merchant in order to complete the purchase by transmitting the customer's financial information to the merchant.

21. The system of claim 15, wherein the transaction center is further configured to initiate electronic debiting of the account of the customer and crediting of the account of the merchant in order to complete the purchase upon the customer expressing intent to complete the purchase within a predetermined time period.

* * * * *

UNITED STATES PATENT AND TRADEMARK OFFICE
CERTIFICATE OF CORRECTION

PATENT NO. : 7,593,870 B2
APPLICATION NO. : 11/041077
DATED : September 22, 2009
INVENTOR(S) : Jalili It is certified that error appears in the above-identified patent and that said Letters Patent is hereby corrected as shown below:

Column 9
Line 29, delete "farther" and insert --further--

Signed and Sealed this

First Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,593,870 B2　　　　　　　　　　　　　　　　　　　　Page 1 of 1
APPLICATION NO. : 11/041077
DATED : September 22, 2009
INVENTOR(S) : Reza Jalili It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 892 days.

Signed and Sealed this

Twenty-eighth Day of September, 2010

David J. Kappos
*Director of the United States Patent and Trademark Office*